(12) United States Patent
Demjanenko et al.

(10) Patent No.: US 6,222,890 B1
(45) Date of Patent: Apr. 24, 2001

(54) VARIABLE SPECTRAL SHAPING METHOD FOR PCM MODEMS

(75) Inventors: Victor Demjanenko, Pendleton, NY (US); Frederic J. Hirzel, Sunnyvale, CA (US)

(73) Assignee: Vocal Technologies, Ltd., Buffalo, NY (US)

( * ) Notice: Subject to any disclaimer, the term of this patent is extended or adjusted under 35 U.S.C. 154(b) by 0 days.

(21) Appl. No.: 09/056,455

(22) Filed: Apr. 7, 1998

Related U.S. Application Data (60) Provisional application No. 60/043,068, filed on Apr. 8, 1997.

(51) Int. Cl.[7] .............................. H04L 1/02; H04L 25/03; H04L 25/19
(52) U.S. Cl. ........................................... 375/296; 332/123
(58) Field of Search ..................................... 375/296, 295; 332/123

(56) References Cited

U.S. PATENT DOCUMENTS

| | | | |
|---|---|---|---|
| 4,932,061 | * | 6/1990 | Kroon et al. ............... 704/223 |
| 5,396,519 | * | 3/1995 | Betts et al. ................ 375/296 |
| 5,463,661 | * | 10/1995 | Moran et al. .............. 375/222 |
| 5,619,503 | * | 4/1997 | Dent ......................... 370/330 |
| 5,970,100 | * | 10/1999 | Olafsson et al. .......... 375/296 |

* cited by examiner

Primary Examiner—Stephen Chin
Assistant Examiner—Lenny Jiang
(74) Attorney, Agent, or Firm—Foley & Lardner (57) ABSTRACT

A method of shaping a transmit spectrum of a PCM modem comprising: selecting a first symbol from a first subset of predetermined symbols; converting said first symbol to its linear value equivalent representation; applying said linear value to a transmit shaping transfer function to obtain a shaping function result; and using said shaping function result to choose a second subset of predetermined symbols for transmission of a second symbol. A method of shaping a transmit spectrum of a PCM modem, comprising: converting a symbol to its linear value equivalent representation; and, applying said linear value to a transmit shaping transfer function to obtain a shaping cost function result, wherein said transmit shaping transfer is expressed in the form of $H(z)=(1-a_1 z^{-1})/(1-b_1 z^{-1})$ wherein:

$a_1$ and $b_1$ are coefficients selected to represent the desired spectral shape.

A method of shaping a transmit spectrum of a PCM modem, comprising: converting a symbol to its linear value equivalent representation; and, applying said linear value to a transmit shaping transfer function to obtain a shaping cost function result, wherein said transmit shaping transfer function is expressed in the form of $H(z)=((1-a_1 z^{-1})/(1-b_1 z^{-1}))*((1-a_2 z^{-1})/(1-b_2 z^{-1}))$, wherein:

$a_1$, $a_2$, $b_1$ and $b_2$ are coefficients selected to represent the desired spectral shape.

5 Claims, 3 Drawing Sheets

Figure 3a. Test A, HPF, Linear Values

Figure 3b. TestB, LPF, Linear Values

Figure 3c. Test C, BPF, Linear Values

Figure 3d. Test D, ODD, Linear Values

Figure 4a. Test A, HPF, PCM Values

Figure 4b. Test B, LPF, PCM Values

Figure 4c. Test C, BPF, PCM Values

Figure 4d. Test D, ODD, PCM Values

VARIABLE SPECTRAL SHAPING METHOD FOR PCM MODEMS

This nonprovisional patent application claims the benefit under 35 U.S.C. Section 119(e) of U.S. Provisional Patent Application No. 60/043,068 filed on Apr. 8, 1997.

FIELD OF THE INVENTION

The present invention pertains generally to modem technology, more particularly to PCM modem technology, and, more particularly, to a variable spectral shaping method for PCM modems.

BACKGROUND OF THE INVENTION

Without any transmit spectral shaping, the analog downstream signal of a PCM modem can encounter the following analog impairments:
A. Inability to pass low frequency (DC) content of the downstream signal due to analog circuitry used for DC loop signaling;
B. Inability to pass high frequency (near 4000 Hz) content of the downstream signal due to both the shape of the central office PCM anti-imaging filter and analog loop characteristics;
C. Excessive non-linear distortion caused by significant low frequency energy in the transmit signal; and
D. Single frequency injection (50 Hz/60 Hz) within the analog channel which may cause performance degradation.

Various methods have been proposed to shape the PCM downstream transmit spectrum. These methods are essentially variants of the following approach:
A. Separate the set L of all valid transmit PCM values into N subsets. All N subsets contains one or more symbols of L. No subset contains symbols that are within any other subset. For example, the most discussed method has L/2 subsets, each subset containing a positive and negative value of the same magnitude;
B. Select a particular subset of the possible N subsets from the transmitted bits; and
C. Select one of the plurality of symbols within the selected subset based upon minimizing a cost function. Most frequently the cost function is a running digital sum (RDS).

The primary problem with the above approach is the selection of the necessary amount of symbol redundancy to achieve the desired transmit spectrum. If the sign of the selected symbols is used, 1 bit of transmit signal is lost due to shaping. This fixed amount of symbol redundancy may be too much for simple spectral shaping or too little for complex spectral shaping requirements.

DETAILED DESCRIPTION OF THE PREFERRED EMBODIMENT

In this invention, a method is described which does not rely explicitly upon any symbol redundancy of the transmit symbol set L. Rather, the transmit spectral shaping is determined directly from mapping discrete selected symbols to discrete transmit symbols. The method is general purpose and can be used to create any desired transmit spectrum. The amount of bits lost due to transmit spectral shaping is determined automatically through the operation of the method.

As an analogous problem, consider the transmit set L as the set of odd integers. The selected symbols are bounded by a maximal odd value N. For example, a set of selected symbols could be the set of odd integers $-N<=u(t)<=+N$; N odd, integral; $u(t)$ equally probable. Here the selected symbol set has L symbols; $L=N+1$. The transmitted symbols are of the same type, odd integers, but have the range $-N'<=y(t)<=+N'$; N' odd, integral. The transmit symbol set has L' symbols; $L'=N'+1$.

The transmit symbols are related to the selected symbols by the transfer function 1+H such at $y(t)=(1+H)*u(t)$. H is a transfer function defined as $H=h(i)*u(t-i)$; i=1 to n. Since the spectrum of the selected symbols $u(t)$ is white, (the symbols are equally probable,) then the transmitted symbols $y(t)$ will be shaped to the spectrum of the transfer function 1+H.

Several configurations exist for a transmitter that satisfy the above constraints. One of these configurations is embodied within the transmit precoder specified within V.34. This configuration will be used throughout the remainder of this contribution because of the familiarity of its organization to the majority of this contribution's readers. It is appreciated, though, that several other configurations exist.

Figure 1:
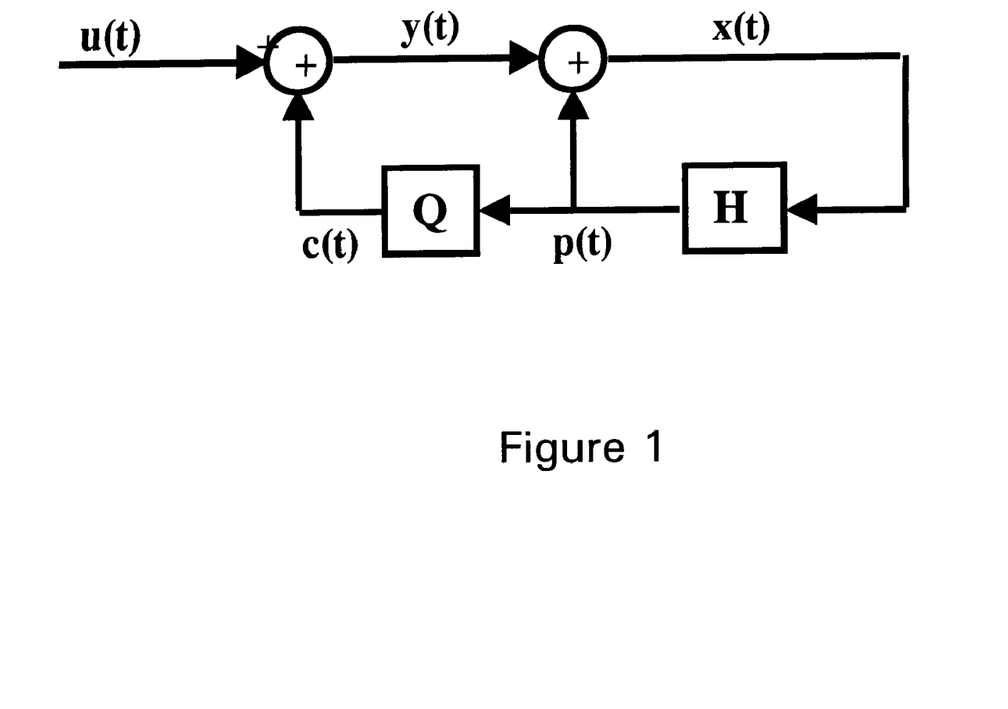
FIG. 1 illustrates a V.34 transmit precoder used as a transmit spectral shaper in accordance with the invention.

The V.34 transmit precoder is illustrated below. (FIG. 1.) For our purposes, the transmit symbols $u(t)$ and subsequent processing are real and one-dimensional, rather than complex and two-dimensional as in V.34.

The need for discrete, odd, finite $y(t)$ of the V.34 transmitter is driven by the desire to create a signal within the V.34 transmitter for trellis encoding. Since the input to the transmitter trellis encoder is also the input to the receiver trellis decoder, the need for discrete symbols is obvious.

Within V.34, the signal $x(t)$ is transmitted from the precoder. Within the proposed system, though, the signal $y(t)$ is transmitted. The receiver simply makes decisions upon $y(t)$ and then performs the inverse precoding operation upon the decision $y(t)$ to recover $u(t)$.

Properties of Example Configuration

The V.34 transmitter as conventionally used within V.34 maps symbols $u(t)$ to symbols $x(t)$ producing auxiliary symbols $y(t)$. This mapping is accomplished through ancillary symbols $p(t)$ and $c(t)$. The properties of these symbols are as follows:
$u(t)$ discrete, odd, finite, spectrally white
$y(t)$ discrete, odd, finite, spectrally shaped 1+H
$x(t)$ continuous, spectrally white
$c(t)$ discrete, multiple of 2W, finite The energy increase of the transmitted symbols $y(t)$ in respect to selected symbols $u(t)$ would be energy of the transfer function 1+H; namely, $1+\text{sum } h(i)^2$. The maximal magnitude increase of the transmitted symbols $y(t)$ in respect to the selected symbols $u(t)$ would likewise be $1+\text{sum } |h(i)|$.

The energy and magnitude gain of symbols $y(t)$ in respect to $u(t)$ can be treated as the "extra" bits needed by the transmitter to produce a spectrally shaped transmit signal. In this sense an analogy can be made to the symbol redundancy of the existing proposals for spectral shaping.

The operation of the transmitter is obviously stable for any 1+H. The decode operation, though, involves implementing the transfer function 1/(1+H). This function will be unstable whenever the function 1+H has zeros on or beyond the unit circle. Even for zeros slightly within the unit circle, decision errors may persist for a very long time. Either 1+H must be constrained to have zeros within the unit circle or alternately the inverse function 1(1+H) may be approximated by a FIR to limit the propagation of decision errors.

Performance of Example Configuration

The performance of this example transmit configuration is very favorable (FIGS. 3a–3d). Four test filters were implemented for the transmit shaping transfer function 1+H namely:

test A. HPF $\quad 1+H = \dfrac{1-.99Z^{\wedge}-1}{1-.78Z^{\wedge}-1}$ test B. LPF $\quad 1+H = \dfrac{1+.99Z^{\wedge}-1}{1+.78Z^{\wedge}-1}$ test C. BPF $\quad 1+H = \dfrac{1+.99Z^{\wedge}-1}{1+.78Z^{\wedge}-1} * \dfrac{1-.99Z^{\wedge}-1}{1-.78Z^{\wedge}-1}$ test D. ODD $\quad 1+H = 1-.5Z^{\wedge}-1+.5Z^{\wedge}-2$ These filters are not given as any guide to the proper formation of actual transmit shaping spectrum. Rather, they were easy to synthesize with well known properties. In particular, we have been using them to investigate the effects of zeros of 1+H near the unit circle.

The selected symbol set was odd integers of the range −63 to +63. The symbols were chosen randomly through the ANSI random number generator. The selected transmit values were by ((rand( ) % 64)*2−63).

The transmitter was run for 512 symbols before analysis was started. Analysis was performed by passing the next 8192 symbols through a sliding 512 point FFT. The symbols were windowed with a Hanning window.

Adaption of Example Configuration to PCM Data

Figure 2:
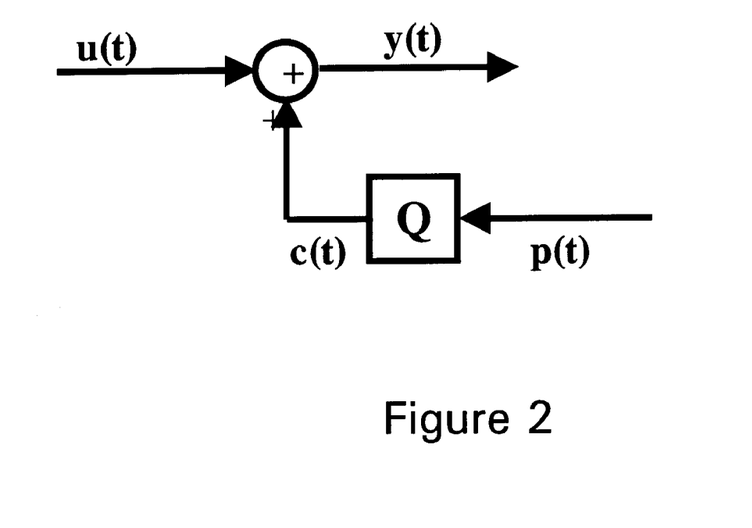
FIG. 2 illustrates a transmit configuration for PCM samples in accordance with the invention.
Figure 3A:
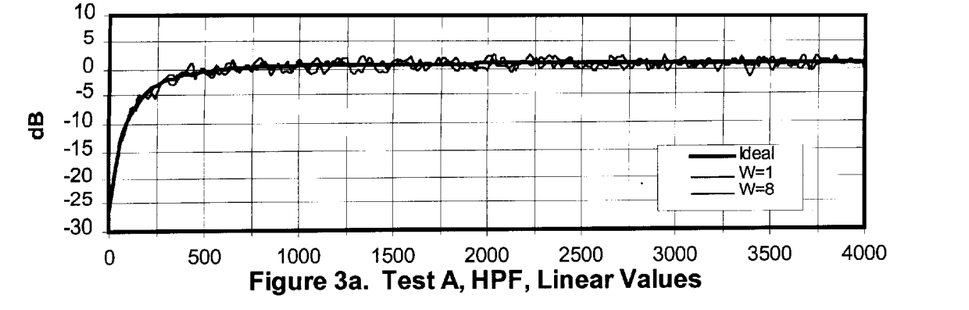
FIGS. 3a, 3b, 3c and 3d illustrate test results for an exemplary configuration in accordance with the invention.
Figure 3B:
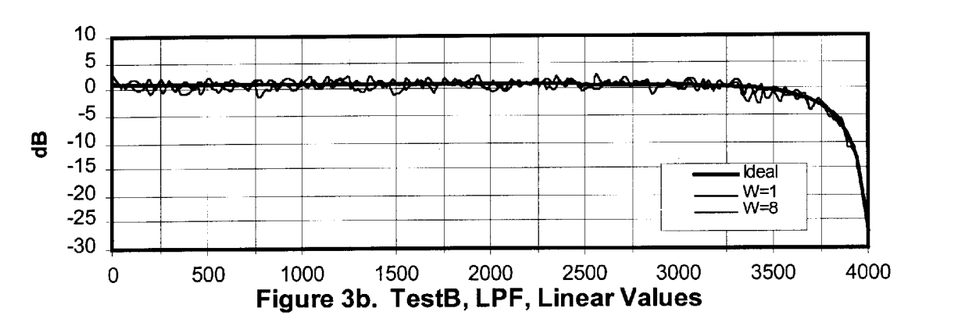
Figure 3C:
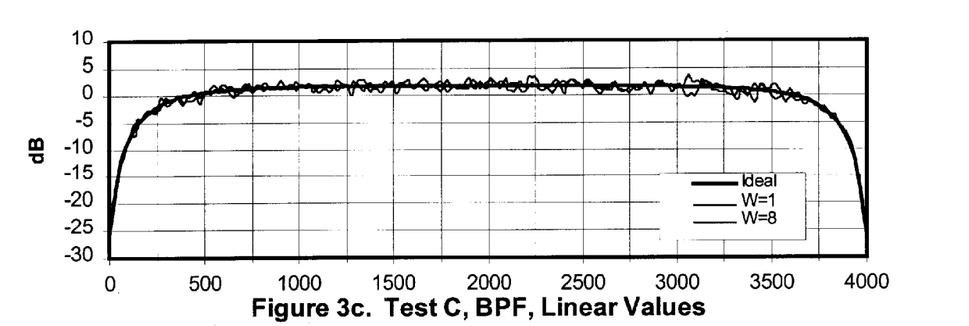
Figure 3D:
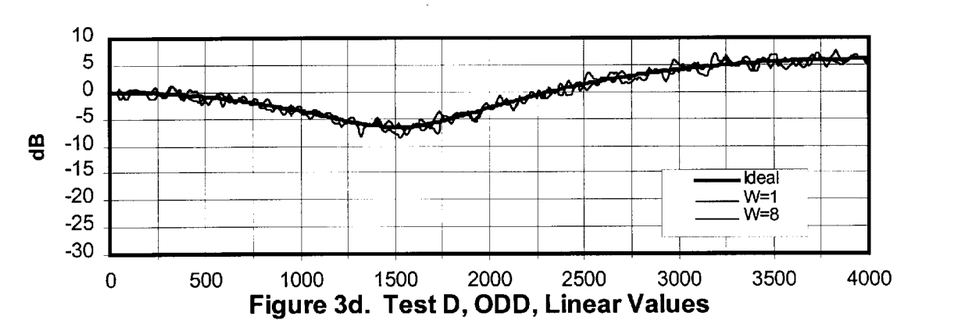
Figure 4A:
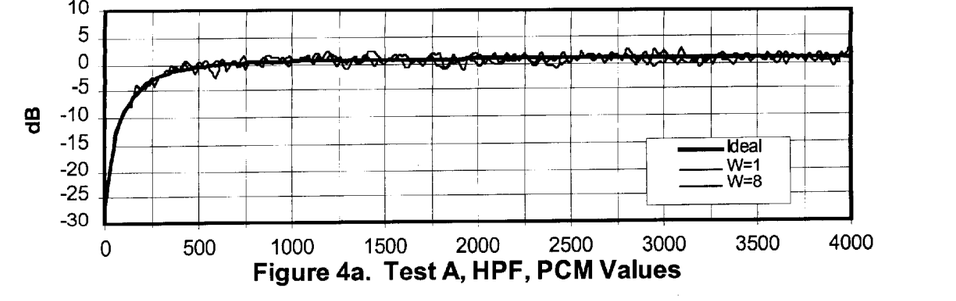
FIGS. 4a, 4b, 4c and 4d illustrate test results for a PCM configuration in accordance with the invention.
Figure 4B:
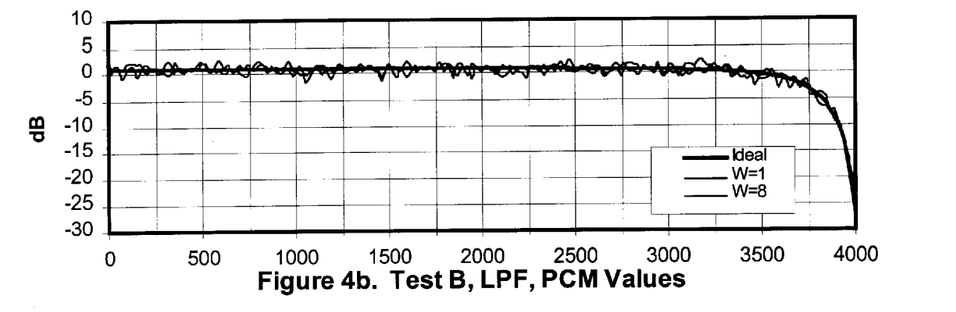
Figure 4C:
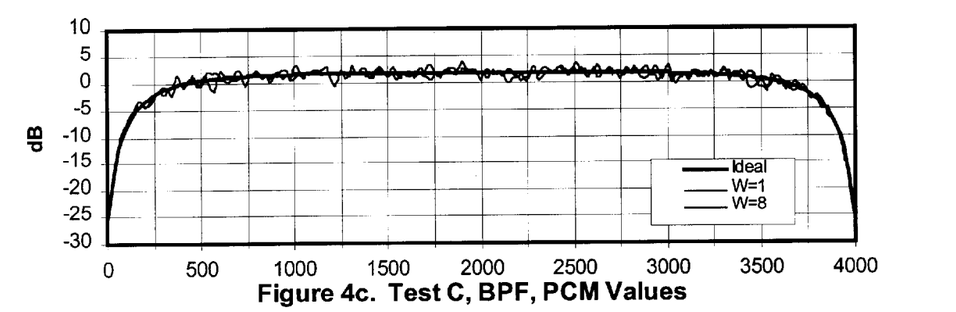
Figure 4D:
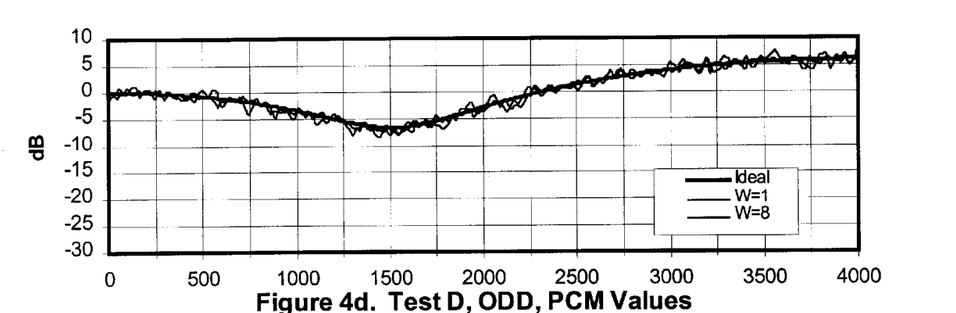

The adaption of the example transmit configuration for PCM samples is straight forward. The adaption centers upon the quantization of p(t) to c(t) and the addition of u(t) and c(t) when creating y(t). (FIG. 2.)

The definition of PCM samples does not allow the normal arithmetic operations of addition, subtraction, multiplication, etc., to be performed where PCM samples are a result of the arithmetic operation. As such, the addition of u(t) and c(t) to create y(t) will not create y(t) PCM samples when u(t) and c(t) are PCM samples. This apparent obstacle is resolved by making u(t), for each particular c(t), a non-PCM value such that when u(t) is added to c(t), y(t) is always a PCM sample.

The PCM implementation of the transmitter, in respect to p(t), c(t), u(t) and y(t) is as follows:
A. All y(t) symbols are valid transmit PCM symbol values. These PCM symbol values do not have to constitute the entire PCM symbol set. For example, PCM symbols may be excluded from the y(t) symbol set because of digital gain blocks, law changes, dmin considerations, etc.
B. All p(t) quantizations to c(t) are to the nearest valid PCM decision point. If exactly between decision points, it is quantized to the smallest magnitude decision point. This creates a set of c(t) quantized values of size one less than the size of the set of y(t) PCM symbol values. The symbol p(t) is quantized as c(t) to the symbol set y(t).
C. An unique set u(t) is created for each c(t) value. Each symbol set u(t), which is NOT PCM symbols, for each c(t) has the following properties:
  1. For each c(t), the expected energy of the associated u(t) symbols is constant.
  2. For each c(t), when u(t) symbols are chosen by the transmit mapping function, the spectrum of u(t) is white.
  3. Additionally, no u(t), c(t) addition results in a modulus or wraparound of the most positive value of y(t) to a negative value or of the most negative value of y(t) to a positive value.

The formation of sets u(t) for each c(t) is straight forward. Though all sets u(t) may be calculated prior to the transmission of the first symbol, if there are too many sets, they may be created dynamically.

When transmitting a symbol, the following operations are performed:
A. The previously quantized p(t) value, c(t), selects its associated transmit symbol set u(t).
B. Bits are mapped to one of the symbols within u(t).
C. The selected symbol u(t) is added to symbol c(t) producing a valid transmit symbol y(t).
D. The previously calculated p(t) is subtracted from the transmit symbol y(t) to produce an intermediate symbol x(t). The symbol x(t) has continuous values, not discrete PCM values.
E. The symbol x(t) is inserted into the shaping filter H producing a new symbol p(t).
F. The symbol p(t) is quantized to a new symbol c(t).

This sequence of operations is directly analogous to that of the V.34 preceding filter.

When receiving a symbol, the analogous V.34 inverse operations are performed. The only detail within the receiver that needs to be discussed is the recovery of the symbol u(t) and hence its representative bits. The operation for this subsection of the receiver is:
A. Make a receive decision on y(t) and predict the p(t) and its quantized value c(t) used in the transmitter.
B. Subtract the symbol c(t) from y(t) producing a tentative u(t).
C. Using c(t), find the symbol set u(t) for this c(t).
D. Search the particular symbol set u(t) for the closest symbol to the tentative value of u(t).
E. Determine from this value what bits the transmitter used to select this value of u(t).

Performance of Example PCM Configuration

The performance of this example transmit configuration adapted to PCM symbol values matches the performance of the example transmit configuration for integer values (FIGS. 4a–4d). The same four test filters were implemented for the transmit shaping transfer 1+H as for the integer simulation.

The transmit symbol set used in the simulation was that for PCM u-law encoding. Each simulation transmitted approximately −12.5 dBm PCM symbol energy. This transmit energy was maintained by setting the target symbol energy of the symbol sets u(t) to −12.5 dBm minus the dB of the energy gain of the shaping transfer function 1+H.

It is realized that each value of c(t) can produce a different number of symbols within a particular symbol set u(t). As the transmitter operates and the transmit spectrum is shaped, there are fewer symbol values for larger magnitude values of c(t). The cumulative effect is less average bits sent per symbol. Depending upon the amount of shaping desired, more or less bits are sent. Though the average bit rate is constant, the instantaneous bit rate of this method varies depending upon values of c(t).

The reduction of the average bit rate to that of the unshaped spectrum (approximately 7.6 bits for 200 smallest PCM symbols) is due to the redundancy required to produce the appropriate shaped spectrum. For the given transmit filters, the average bit rates for maximally packed and minimally packed symbol sets compares favorably to those published for the multiple redundancy methods. (Table 1.)

TABLE 1

Comparison of Spectral Shaping Performance

| test #<br>test type | test A.<br>HPF | test B.<br>LPF | test C.<br>BPF | test D.<br>ODD |
|---|---|---|---|---|
| magnitude increase (dB) | | | | |
| calculated | 5.82 | 5.82 | 5.80 | 6.02 |
| linear (W = 1) | 3.57 | 3.57 | 4.60 | 5.95 |
| linear (W = 8) | 3.57 | 3.57 | 4.92 | 6.09 |
| u-law (W = 1) | 0.36 | 0.73 | 1.57 | 2.52 |
| u-law (W = 8) | −0.05 | −0.05 | 0.46 | 3.16 |
| energy increase (dB) | | | | |
| calculated | 0.46 | 0.46 | 0.86 | 1.76 |
| linear (W = 1) | 0.47 | 0.47 | 0.86 | 1.80 |
| linear (W = 8) | 0.50 | 0.57 | 0.92 | 1.81 |
| u-law (W = 1) | 0.46 | 0.46 | 0.87 | 1.85 |
| u-law (W = 8) | 0.44 | 0.45 | 0.91 | 1.83 |
| PCM transmit power (−12.5 dBm nominal) | | | | |
| u-law (W = 1) | −12.29 | −12.30 | −12.32 | −12.15 |
| u-law (W = 8) | −12.29 | −12.27 | −12.30 | −12.24 |
| Transmit u-law bit efficiency (7.6 bits/symbol reference) | | | | |
| maximal (W = 1) | 6.77 | 6.76 | 6.60 | 6.28 |
| maximal (W = 8) | 6.75 | 6.75 | 6.61 | 6.28 |
| minimal (W = 1) | 6.32 | 6.30 | 6.13 | 5.79 |
| minimal (W = 8) | 6.28 | 6.29 | 6.14 | 5.91 |

Properties of Example PCM Configuration

Though similar in performance in many respects to the previously described methods, the transmit shaping method described in this contribution has the following properties:

A. The symbol "redundancy" of the previously described methods is automatic. Transmit spectra which require more or less redundancy are determined automatically.

B. It is compatible with trellis decoding since the symbol sets u(t) can each be partitioned into two subsets, one for a trellis bit of 1 and one for a trellis bit of 0.

C. It can be made compatible with maximal packing techniques. Since the number of symbols of u(t) is not known before c(t) is calculated, the product maximal packing cannot be applied. Other maximal packing techniques, though, can be used.

D. Transmit spectral pre-emphasis can be trivially accomplished by specifying the appropriate response 1+H.

This invention describes a novel method of shaping the transmit spectrum of the downstream PCM channel of a PCM modem. It is general purpose and can shape the transmit spectrum to any spectral shape. The need for specifying the redundancy of previous methods is eliminated. The proposed method automatically requests less bits directly from the spectral shape desired.

The incorporation of this spectral shaping method into the standard allows the receiver to determine the spectral shaping required for maximum throughput. The transmission of the coefficients of the response 1+H can be achieved by sending the actual coefficients or a multiplicity of codes which result in the best compromise spectral shapes based upon actual field trials.

What we claim is:

1. A method of transmitting data from a PCM modem comprising:
   performing a transmit spectrum shaping process comprising:
   selecting a first symbol from a first subset of predetermined symbols;
   converting the first symbol to its linear value equivalent representation;
   applying the linear value to a transmit shaping transfer function to obtain a shaping function result; and
   using the shaping function result to choose a second subset of predetermined symbols for transmission of a second symbol; and
   transmitting symbols from the PCM modem selected in accordance with a result of the transmit spectrum shaping process.

2. A method of transmitting data from a PCM modem, comprising:
   performing a transmit spectrum shaping process comprising:
   converting a symbol to its linear value equivalent representation; and,
   applying the linear value to a transmit shaping transfer function to obtain a shaping cost function result, wherein the transmit shaping transfer is expressed in the form of $H(z)=(1-a_1 z^{-1})/(1-b_1 z^{-1})$, where $a_1$ and $b_1$ are coefficients selected to represent the desired spectral shape; and
   transmitting symbols from the PCM modem selected in accordance with a result of the transmit spectrum shaping process.

3. A method of transmitting data from a PCM modem, comprising:
   performing a transmit spectrum shaping process comprising:
   converting a symbol to its linear value equivalent representation; and,
   applying the linear value to a transmit shaping transfer function to obtain a shaping cost function result, wherein the transmit shaping transfer function is expressed in the form of $H(z)=((1-a_1 z^{-1})/(1-b_1 z^{-1}))*((1-a_2 z^{-1})/(1-b_2 z^{-1}))$, where $a_1$, $a_2$, $b_1$ and $b_2$ are coefficients selected to represent the desired spectral shape; and
   transmitting symbols from the PCM modem selected in accordance with a result of the transmit spectrum shaping process.

4. A PCM modem, comprising:
   means for shaping a transmit spectrum by converting a symbol to its linear value equivalent representation, and applying the linear value to a transmit shaping transfer function to obtain a shaping cost function result, wherein the transmit shaping transfer is expressed in the form of $H(z)=(1-a_1 z^{-1})/(1-b_1 z^{-1})$, where $a_1$ and $b_1$ are coefficients selected to represent the desired spectral shape; and
   means for transmitting symbols from the PCM modem, the symbols being selected in accordance with a transmit spectrum shaped by the transmit spectrum shaping means.

5. A PCM modem, comprising:
   means for shaping a transmit spectrum by converting a symbol to its linear value equivalent representation, and applying the linear value to a transmit shaping transfer function to obtain a shaping cost function result, wherein the transmit shaping transfer function is expressed in the form of $H(z)=((1-a_1 z^{-1})/(1-b_1 z^{-1}))*((1-a_2 z^{-1})/(1-b_2 z^{-1}))$, where $a_1$, $a_2$, $b_1$ and $b_2$ are coefficients selected to represent the desired spectral shape, and
   means for transmitting symbols from the PCM modem, the symbols being selected in accordance with a transmit spectrum shaped by the transmit spectrum shaping means.

* * * * *

UNITED STATES PATENT AND TRADEMARK OFFICE
CERTIFICATE OF CORRECTION

PATENT NO. : 6,222,890 B1
DATED : April 24, 2001
INVENTOR(S) : Victor Demjanenko et al.

It is certified that error appears in the above-identified patent and that said Letters Patent is hereby corrected as shown below:

Title page should be deleted and substitute therefore the attached title page.

Delete specification, col. 1-6 and substitute therefore the attached specification col. 1-8.

Signed and Sealed this

Twenty-third Day of August, 2005

JON W. DUDAS
*Director of the United States Patent and Trademark Office*

United States Patent
Demjanenko et al.

(10) Patent No.: US 6,222,890 B1
(45) Date of Patent: Apr. 24, 2001

(54) VARIABLE SPECTRAL SHAPING METHOD FOR PCM MODEMS

(75) Inventors: Victor Demjanenko, Pendleton, NY (US); Frederic J. Hirzel, Sunnyvale, CA (US)

(73) Assignee: Vocal Technologies, Ltd., Buffalo, NY (US)

( * ) Notice: Subject to any disclaimer, the term of this patent is extended or adjusted under 35 U.S.C. 154(b) by 0 days.

(21) Appl. No.: 09/056,455

(22) Filed: Apr. 7, 1998

Related U.S. Application Data (60) Provisional application No. 60/043,068, filed on Apr. 8, 1997.

(51) Int. Cl.[7] .......................... H04K 1/02; H04L 25/03; H04L 25/49
(52) U.S. Cl. ......................................... 375/296; 332/123
(58) Field of Search ................................ 375/296, 295; 332/123

(56) References Cited

U.S. PATENT DOCUMENTS

| | | | | |
|---|---|---|---|---|
| 4,932,061 | A | * 6/1990 | Kroon et al. | 704/223 |
| 5,396,519 | A | * 3/1995 | Betts et al. | 375/296 |
| 5,463,661 | A | * 10/1995 | Moran et al. | 375/222 |
| 5,619,503 | A | * 4/1997 | Dent | 370/330 |
| 5,970,100 | A | * 10/1999 | Olafsson et al. | 375/296 |

* cited by examiner

*Primary Examiner*—Stephen Chin
*Assistant Examiner*—Lenny Jiang (74) *Attorney, Agent, or Firm*—Foley & Lardner (57) ABSTRACT

A method of transmitting data from a PCM modem comprises shaping a transmit spectrum of the PCM modem by selecting a first symbol from a first subset of predetermined symbols, converting the first symbol to its linear value equivalent representation, applying the linear value to a transmit shaping transfer function to obtain a shaping function result, and using the shaping function result to choose a second subset of predetermined symbols for transmission of a second symbol, and then transmitting symbols selected in accordance with the result of the shaping process. Another method of transmitting data from a PCM modem comprises shaping a transmit spectrum of the PCM modem by converting a symbol to its linear value equivalent representation, and applying the linear value to a transmit shaping transfer function to obtain a shaping cost function result, where the transmit shaping transfer is expressed in the form of $H(z)=(1-a_1z^{-1})/(1-b_1z^{-1})$, and where $a_1$ and $b_1$ are coefficients selected to represent the desired spectral shape, and then transmitting symbols from the PCM modem selected in accordance with the result of the shaping process. Another method of transmitting data from a PCM modem comprises shaping a transmit spectrum of the PCM modem by converting a symbol to its linear value equivalent representation, and applying the linear value to a transmit shaping transfer function to obtain a shaping cost function result, where the transmit shaping transfer function is expressed in the form of $H(z)=((1-a_1z^{-1})/(1-b_1z^{-1}))*((1-a_2z^{-1})/(1-b_2z^{-1}))$, and where $a_1$, $a_2$, $b_1$ and $b_2$ are coefficients selected to represent the desired spectral shape, and then transmitting symbols from the PCM modem selected in accordance with the result of the shaping process.

5 Claims, 3 Drawing Sheets

VARIABLE SPECTRAL SHAPING METHOD FOR PCM MODEMS

This nonprovisional patent application claims the benefit under 35 U.S.C. Section 119(e) of U.S. Provisional patent application Ser. No. 60/043,068 filed on Apr. 8, 1997.

FIELD OF INVENTION

The present invention pertains generally to modem technology, more particularly to PCM modem technology, and, more particularly, to a variable spectral shaping method for PCM modems.

BACKGROUND OF THE INVENTION

Without any transmit spectral shaping, the analog downstream signal of a PCM modem can encounter the following analog impairments:

A. Inability to pass low frequency (DC) content of the downstream signal due to analog circuitry used for DC loop signaling;

B. Inability to pass high frequency (near 4000 Hz) content of the downstream signal due to both the shape of the central office PCM anti-imaging filter and analog loop characteristics;

C. Excessive non-linear distortion caused by significant low frequency energy in the transmit signal; and D. Single frequency injection (50 Hz/60 Hz) within the analog channel which may cause performance degradation.

Various methods have been proposed to shape the PCM downstream transmit spectrum. These methods are essentially variants of the following approach:

A. Separate the set L of all valid transmit PCM values into N subsets. All N subsets contain one or more symbols of L. No subset contains symbols that are within any other subset. For example, the most discussed method has L/2 subsets, each subset containing a positive and negative value of the same magnitude;

B. Select a particular subset of the possible N subsets from the transmitted bits; and C. Select one of the plurality of symbols within the selected subset based upon minimizing a cost function. Most frequently the cost function is a running digital sum (RDS).

The primary problem with the above approach is the selection of the necessary amount of symbol redundancy to achieve the desired transmit spectrum. If the sign of the selected symbols is used, 1 bit of transmit signal is lost due to shaping. This fixed amount of symbol redundancy may be too much for simple spectral shaping or too little for complex spectral shaping requirements.

SUMMARY OF THE INVENTION

The invention improves over the conventional approach by determining spectral shaping by mapping discrete selected symbols to discrete transmit symbols. This allows the creation of any desired transmit spectrum.

DETAILED DESCRIPTION OF THE PREFERRED EMBODIMENT

In this invention, a method is described which does not rely explicitly upon any symbol redundancy of the transmit symbol set L. Rather, the transmit spectral shaping is determined directly from mapping discrete selected symbols to discrete transmit symbols. The method is general purpose and can be used to create any desired transmit spectrum. The amount of bits lost due to transmit spectral shaping is determined automatically through the operation of the method.

As an analogous problem, consider the transmit set L as the set of odd integers. The selected symbols are bounded by a maximal odd value N. For example, a set of selected symbols could be the set of odd integers $-N<=u(t)<=+N$; N odd, integral; $u(t)$ equally probable. Here the selected symbol set has L symbols; $L=N+1$. The transmitted symbols are of the same type, odd integers, but have the range $-N'<=y(t)<=+N'$; N' odd, integral. The transmit symbol set has L' symbols; $L'=N'+1$.

The transmit symbols are related to the selected symbols by the transfer function $1+H$ such that $y(t)=(1+H) * u(t)$. H is a transfer function defined as $H=h(i)*u(t-i)$; $i=1$ to n. Since the spectrum of the selected symbols $u(t)$ is white, (the symbols are equally probable,) then the transmitted symbols $y(t)$ will be shaped to the spectrum of the transfer function $1+H$.

Several configurations exist for a transmitter that satisfies the above constraints. One of these configurations is embodied within the transmit precoder specified within V.34. This configuration will be used throughout the remainder of this contribution because of the familiarity of its organization to those of ordinary skill in the art. It is appreciated, though, that several other configurations exist.

A V.34 transmit precoder used as a spectral shaper in accordance with the invention is illustrated below in FIG. 1. For purposes of this example, the transmit symbols $u(t)$ and subsequent processing are real and one-dimensional, rather than complex and two-dimensional as in V.34. As shown in FIG. 1, a quantizer Q is controlled by $W=n$, using nearest n intervals.

The need for discrete, odd, finite $y(t)$ of the V.34 transmitter is driven by the desire to create a signal within the V.34 transmitter for trellis encoding. Since the input to the transmitter trellis encoder is also the input to the receiver trellis decoder, the need for discrete symbols is obvious.

Within V.34, the signal $x(t)$ is transmitted from the precoder. Within the proposed system, though, the signal $y(t)$ is transmitted. The receiver simply makes decisions upon $y(t)$ and then performs the inverse preceding operation upon the decision $y(t)$ to recover $u(t)$.

Properties of Example Configuration

The V.34 transmitter as conventionally used within V.34 maps symbols $u(t)$ to symbols $x(t)$ producing auxiliary symbols $y(t)$. This mapping is accomplished through ancillary symbols $p(t)$ and $c(t)$. The properties of these symbols are as follows:

$u(t)$ discrete, odd, finite, spectrally white
$y(t)$ discrete, odd, finite, spectrally shaped $1+H$
$x(t)$ continuous, spectrally white
$c(t)$ discrete, multiple of 2W, finite The energy increase of the transmitted symbols $y(t)$ in respect to selected symbols $u(t)$ would be energy of the transfer function 1+H; namely, 1+ sum h(i)^2. The maximal magnitude increase of the transmitted symbols y(t) in respect to the selected symbols u(t) would likewise be 1+sum |h(i)|.

The energy and magnitude gain of symbols y(t) in respect to u(t) can be treated as the "extra" bits needed by the transmitter to produce a spectrally shaped transmit signal. In this sense an analogy can be made to the symbol redundancy of the existing proposals for spectral shaping.

The operation of the transmitter is obviously stable for any 1+H. The decode operation, though, involves implementing the transfer function 1/(1+H). This function will be unstable whenever the function 1+H has zeros on or beyond the unit circle. Even for zeros slightly within the unit circle, decision errors may persist for a very long time. Either 1+H must be constrained to have zeros within the unit circle or alternately the inverse function 1/(1+H) may be approximated by a FIR to limit the propagation of decision errors.

Performance of Example Configuration

The performance of this example transmit configuration is very favorable, as shown by the test results illustrated in FIGS. 3a–3d. Four test filters were implemented for the transmit shaping transfer function 1+H namely:

$$HPF\ 1+H = \frac{1-.99Z^{-1}}{1-.78Z^{-1}}.$$ test A $$LPF\ 1+H = \frac{1+.99Z^{-1}}{1+.78Z^{-1}}.$$ test B $$BPF\ 1+H = \frac{1+.99Z^{-1}}{1+.78Z^{-1}} * \frac{1-.99Z^{-1}}{1-.78Z^{-1}}.$$ test C $$ODD\ 1+H = 1-.5Z^{-1}+.5Z^{-2}.$$ test D These filters are not given as any guide to the proper formation of actual transmit shaping spectrum. Rather, they were easy to synthesize with well known properties. In particular, we have been using them to investigate the effects of zeros of 1+H near the unit circle.

The selected symbol set was odd integers of the range −63 to +63. The symbols were chosen randomly through the ANSI random number generator. The selected transmit values were generated by ((rand( )%64)*2−63).

The transmitter was run for 512 symbols before analysis was started. Analysis was performed by passing the next 8192 symbols through a sliding 512 point FFT. The symbols were windowed with a Hanning window.

Adaptation of Example Configuration to PCM Data

The adaptation of the example transmit configuration for PCM samples is straight forward. The adaptation centers upon the quantization of p(t) to c(t) and the addition of u(t) and c(t) when creating y(t). FIG. 2 shows an exemplary circuit implementing these functions.

The definition of PCM samples does not allow the normal arithmetic operations of addition, subtraction, multiplication, etc., to be performed where PCM samples are a result of the arithmetic operation. As such, the addition of u(t) and c(t) to create y(t) will not create y(t) PCM samples when u(t) and c(t) are PCM samples. This apparent obstacle is resolved by making u(t), for each particular c(t), a non-PCM value such that when u(t) is added to c(t), y(t) is always a PCM sample.

The PCM implementation of the transmitter, in respect to p(t), c(t), u(t) and y(t) is as follows:

A. All y(t) symbols are valid transmit PCM symbol values. These PCM symbol values do not have to constitute the entire PCM symbol set. For example, PCM symbols may be excluded from the y(t) symbol set because of digital gain blocks, law changes, dmin considerations, etc.

B. All p(t) quantizations to c(t) are to the nearest valid PCM decision point. If exactly between decision points, it is quantized to the smallest magnitude decision point. This creates a set of c(t) quantized values of size one less than the size of the set of y(t) PCM symbol values. The symbol p(t) is quantized as c(t) to the symbol set y(t).

C. An unique set u(t) is created for each c(t) value. Each symbol set u(t), which is NOT PCM symbols, for each c(t) has the following properties:
  1. For each c(t), the expected energy of the associated u(t) symbols is constant.
  2. For each c(t), when u(t) symbols are chosen by the transmit mapping function, the spectrum of u(t) is white.
  3. Additionally, no u(t), c(t) addition results in a modulus or wraparound of the most positive value of y(t) to a negative value or of the most negative value of y(t) to a positive value.

The formation of sets u(t) for each c(t) is straight forward. Though all sets u(t) may be calculated prior to the transmission of the first symbol, if there are too many sets, they may be created dynamically.

When transmitting a symbol, the following operations are performed:

A. The previously quantized p(t) value, c(t), selects its associated transmit symbol set u(t).

B. Bits are mapped to one of the symbols within u(t).

C. The selected symbol u(t) is added to symbol c(t) producing a valid transmit symbol y(t).

D. The previously calculated p(t) is subtracted from the transmit symbol y(t) to produce an intermediate symbol x(t). The symbol x(t) has continuous values, not discrete PCM values.

E. The symbol x(t) is inserted into the shaping filter H producing a new symbol p(t).

F. The symbol p(t) is quantized to a new symbol c(t). This sequence of operations is directly analogous to that of the V.34 precoding filter.

When receiving a symbol, the analogous V.34 inverse operations are performed. The only detail within the receiver that needs to be discussed is the recovery of the symbol u(t) and hence its representative bits. The operation for this subsection of the receiver is:

A. Make a receive decision on y(t) and predict the p(t) and its quantized value c(t) used in the transmitter.

B. Subtract the symbol c(t) from y(t) producing a tentative u(t).

C. Using c(t), find the symbol set u(t) for this c(t).

D. Search the particular symbol set u(t) for the closest symbol to the tentative value of u(t).

E. Determine from this value what bits the transmitter used to select this value of u(t).

Performance of Example PCM Configuration

The performance of this example transmit configuration adapted to PCM symbol values matches the performance of the example transmit configuration for integer values, as shown by the test results illustrated in FIGS. 4a–4d. The same four test filters were implemented for the transmit shaping transfer 1+H as for the integer simulation.

The transmit symbol set used in the simulation was that for PCM u-law encoding. Each simulation transmitted approximately −12.5 dBm PCM symbol energy. This transmit energy was maintained by setting the target symbol energy of the symbol sets u(t) to −12.5 dBm minus the dB of the energy gain of the shaping transfer function 1+H.

It is realized that each value of c(t) can produce a different number of symbols within a particular symbol set u(t). As the transmitter operates and the transmit spectrum is shaped, there are fewer symbol values for larger magnitude values of c(t). The cumulative effect is less average bits sent per symbol. Depending upon the amount of shaping desired, more or less bits are sent. Though the average bit rate is constant, the instantaneous bit rate of this method varies depending upon values of c(t).

The reduction of the average bit rate to that of the unshaped spectrum (approximately 7.6 bits for 200 smallest PCM symbols) is due to the redundancy required to produce the appropriate shaped spectrum. For the given transmit filters, the average bit rates for maximally packed and minimally packed symbol sets compares favorably to those published for the multiple redundancy methods, as shown below in Table 1:

TABLE 1

Comparison of Spectral Shaping Performance

| Test Number | Test A | Test B | Test C | Test D |
|---|---|---|---|---|
| Test Type | HPF | LPF | BPF | ODD |
| Magnitude Increase | | | | |
| calculated | 5.82 | 5.82 | 5.80 | 6.02 |
| linear (W = 1) | 3.57 | 3.57 | 4.60 | 5.95 |
| linear (W = 8) | 3.57 | 3.57 | 4.92 | 6.09 |
| μ-law (W = 1) | 0.36 | 0.73 | 1.57 | 2.52 |
| μ-law (W = 8) | −0.05 | −0.05 | 0.46 | 3.16 |
| energy increase (dB) | | | | |
| calculated | 0.46 | 0.46 | 0.86 | 1.76 |
| linear (W = 1) | 0.47 | 0.47 | 0.86 | 1.80 |
| linear (W = 8) | 0.50 | 0.57 | 0.92 | 1.81 |
| μ-law (W = 1) | 0.46 | 0.46 | 0.87 | 1.85 |
| μ-law (W = 8) | 0.44 | 0.45 | 0.91 | 1.83 |
| PCM transmit power (−12.5 dB nominal) | | | | |
| μ-law (W = 1) | −12.29 | −12.30 | −12.32 | −12.15 |
| μ-law (W = 8) | −12.29 | −12.27 | −12.30 | −12.24 |
| Transmit μ-law bit efficiency (7.6 bits/symbol reference) | | | | |
| maximal (W = 1) | 6.77 | 6.76 | 6.60 | 6.28 |
| maximal (W = 8) | 6.75 | 6.75 | 6.61 | 6.28 |
| minimal (W = 1) | 6.32 | 6.30 | 6.13 | 5.79 |
| minimal (W = 8) | 6.28 | 6.29 | 6.14 | 5.91 |

Properties of Example PCM Configuration

Though similar in performance in many respects to the previously described methods, the transmit shaping method described in this contribution has the following properties:

A. The symbol "redundancy" of the previously described methods is automatic. Transmit spectra which require more or less redundancy are determined automatically.

B. It is compatible with trellis decoding since the symbol sets u(t) can each be partitioned into two subsets, one for a trellis bit of 1 and one for a trellis bit of 0.

C. It can be made compatible with maximal packing techniques. Since the number of symbols of u(t) is not known before c(t) is calculated, the product maximal packing cannot be applied. Other maximal packing techniques, though, can be used.

D. Transmit spectral pre-emphasis can be trivially accomplished by specifying the appropriate response 1+H.

This invention describes a novel method of shaping the transmit spectrum of the downstream PCM channel of a PCM modem. It is general purpose and can shape the transmit spectrum to any spectral shape. The need for specifying the redundancy of previous methods is eliminated. The proposed method automatically requests less bits directly from the spectral shape desired.

The incorporation of this spectral shaping method into the standard allows the receiver to determine the spectral shaping required for maximum throughput. The transmission of the coefficients of the response 1+H can be achieved by sending the actual coefficients or a multiplicity of codes which result in the best compromise spectral shapes based upon actual field trials.

What we claim is:

1. A method of transmitting data from a PCM modem comprising:

performing a transmit spectrum shaping process comprising:

selecting a first symbol from a first subset of predetermined symbols;

converting the first symbol to its linear value equivalent representation;

applying the linear value to a transmit shaping transfer function to obtain a shaping function result; and using the shaping function result to choose a second subset of predetermined symbols for transmission of a second symbol; and transmitting symbols from the PCM modem selected in accordance with a result of the transmit spectrum shaping process.

2. A method of transmitting data from a PCM modem, comprising:

performing a transmit spectrum shaping process comprising:

converting a symbol to its linear value equivalent representation; and, applying the linear value to a transmit shaping transfer function to obtain a shaping cost function result, wherein the transmit shaping transfer is expressed in the form of $H(z)=(1-a_1z^{-1})/(1-b_1z^{-1})$, where $a_1$ and $b_1$ are coefficients selected to represent the desired spectral shape; and transmitting symbols from the PCM modem selected in accordance with a result of the transmit spectrum shaping process.

3. A method of transmitting data from a PCM modem, comprising:

performing a transmit spectrum shaping process comprising:

converting a symbol to its linear value equivalent representation; and, applying the linear value to a transmit shaping transfer function to obtain a shaping cost function result, wherein the transmit shaping transfer function is expressed in the form of $H(z)=((1-a_1z^{-1})/(1-b_1z^{-1}))*((1-a_2z^{-1})/(1-b_2z^{-1}))$, where $a_1$, $a_2$, $b_1$ and $b_2$ are coefficients selected to represent the desired spectral shape; and transmitting symbols from the PCM modem selected in accordance with a result of the transmit spectrum shaping process.

4. A PCM modem, comprising:

means for shaping a transmit spectrum by converting a symbol to its linear value equivalent representation, and applying the linear value to a transmit shaping transfer function to obtain a shaping cost function result, wherein the transmit shaping transfer is expressed in the form of $H(z)=(1-a_1z^{-1})/(1-b_1z^{-1})$, where $a_1$ and $b_1$ are coefficients selected to represent the desired spectral shape; and means for transmitting symbols from the PCM modem, the symbols being selected in accordance with a transmit spectrum shaped by the transmit spectrum shaping means.

5. A PCM modem, comprising:

means for shaping a transmit spectrum by converting a symbol to its linear value equivalent representation, and applying the linear value to a transmit shaping transfer function to obtain a shaping cost function result, wherein the transmit shaping transfer function is expressed in the form of $H(z)=((1-a_1z^{-1})/(1-b_1z^{-1}))*((1-a_2z^{-1})/(1-b_2z^{-1}))$, where $a_1$, $a_2$, $b_1$ and $b_2$ are coefficients selected to represent the desired spectral shape; and means for transmitting symbols from the PCM modem, the symbols being selected in accordance with a transmit spectrum shaped by the transmit spectrum shaping means.

\* \* \* \* \*